(12) United States Patent
Rollins

(10) Patent No.: US 8,794,107 B2
(45) Date of Patent: Aug. 5, 2014

(54) SUBMERGED GEAR AND BEARING GUARD

(75) Inventor: Michael J. Rollins, Chula Vista, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 291 days.

(21) Appl. No.: 12/774,276

(22) Filed: May 5, 2010

(65) Prior Publication Data

US 2011/0271792 A1    Nov. 10, 2011

(51) Int. Cl.
*F16H 57/04*    (2010.01)

(52) U.S. Cl.
USPC .......................................... 74/606 R

(58) Field of Classification Search
USPC ........................ 74/606 R; 184/6.12
See application file for complete search history.

(56) References Cited

U.S. PATENT DOCUMENTS

| | | | |
|---|---|---|---|
| 2,281,905 A | 5/1942 | Young | |
| 3,625,310 A * | 12/1971 | Herrick | 184/6.12 |
| 3,734,637 A * | 5/1973 | Beck, Jr. | 415/122.1 |
| 4,429,587 A * | 2/1984 | Finn et al. | 74/467 |
| 4,470,324 A | 9/1984 | Renk et al. | |
| 4,631,009 A | 12/1986 | Cygnor et al. | |
| 4,683,771 A * | 8/1987 | Sogo et al. | 74/467 |
| 4,693,672 A | 9/1987 | Carvalho | |
| 4,885,953 A | 12/1989 | Sweetland et al. | |
| 4,896,561 A * | 1/1990 | Hayakawa et al. | 74/606 R |
| 5,048,370 A | 9/1991 | Duello | |
| 5,411,116 A | 5/1995 | Kish et al. | |
| 5,555,722 A | 9/1996 | Mehr-Ayin et al. | |
| 5,587,068 A | 12/1996 | Aho, Jr. et al. | |
| 5,845,546 A * | 12/1998 | Knowles et al. | 74/650 |
| 6,691,830 B2 | 2/2004 | Blanc et al. | |
| 7,055,303 B2 | 6/2006 | Macfarlane et al. | |
| 7,137,590 B2 | 11/2006 | Sandrart et al. | |
| 7,984,791 B2 * | 7/2011 | Taguchi et al. | 184/6.12 |
| 2006/0123944 A1 * | 6/2006 | Suzuki et al. | 74/606 R |
| 2009/0314002 A1 * | 12/2009 | Libera et al. | 60/778 |

* cited by examiner

*Primary Examiner* — Vicky Johnson
(74) *Attorney, Agent, or Firm* — Carlson, Gaskey & Olds, P.C.

(57) ABSTRACT

A gearbox for an auxiliary power unit (APU) includes features that prevent submersion of gears in lubricant in extreme attitude orientations. The gearbox includes a plurality of gears that drive various pumps, generators and/or other aircraft systems. A shield surrounds a portion of one of the plurality of gears to prevent lubricant from submerging the gear. The shield defines at least a portion of an open chamber that is at least partially surrounded by lubricant at extreme attitude orientations.

13 Claims, 4 Drawing Sheets

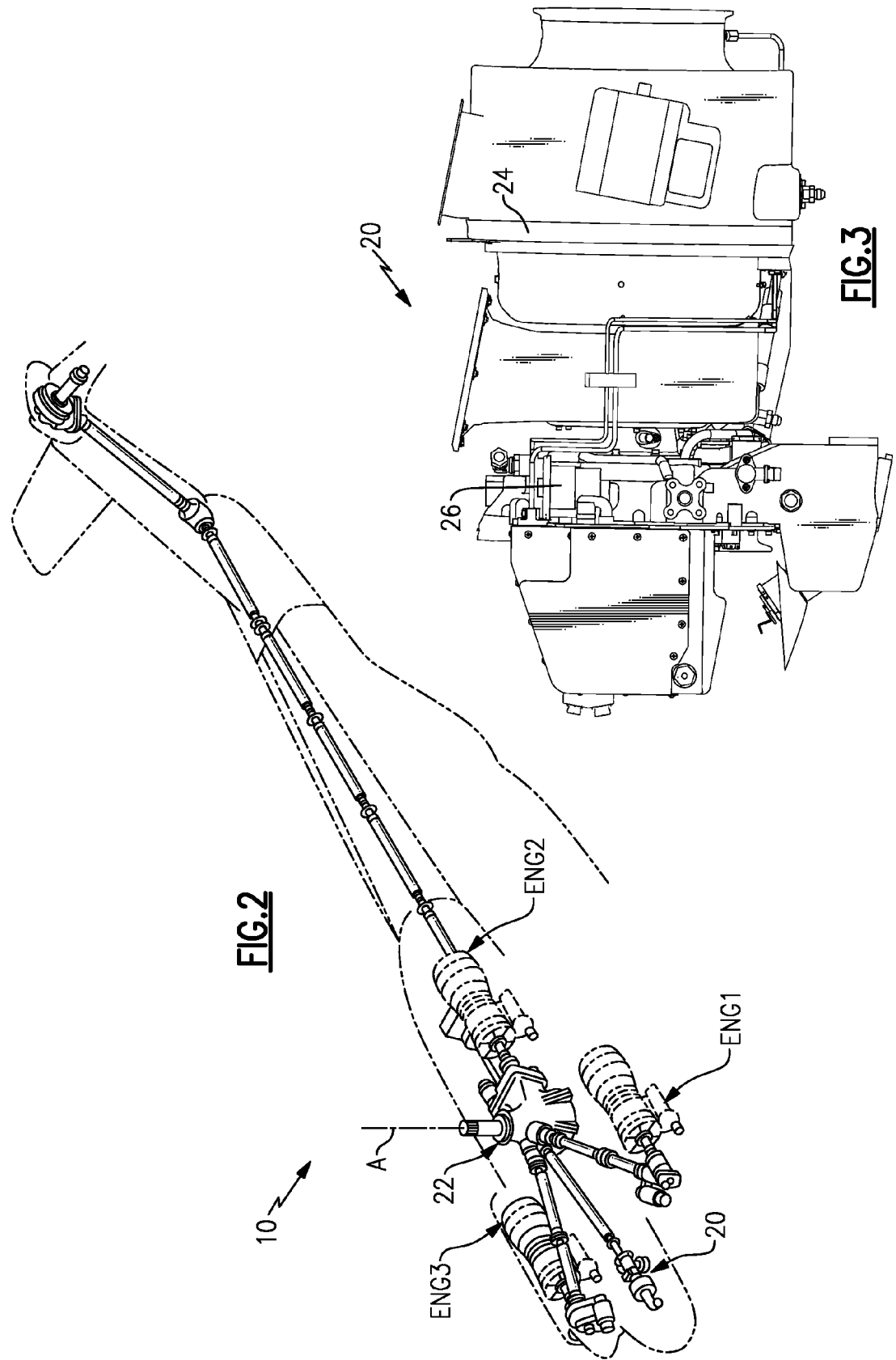

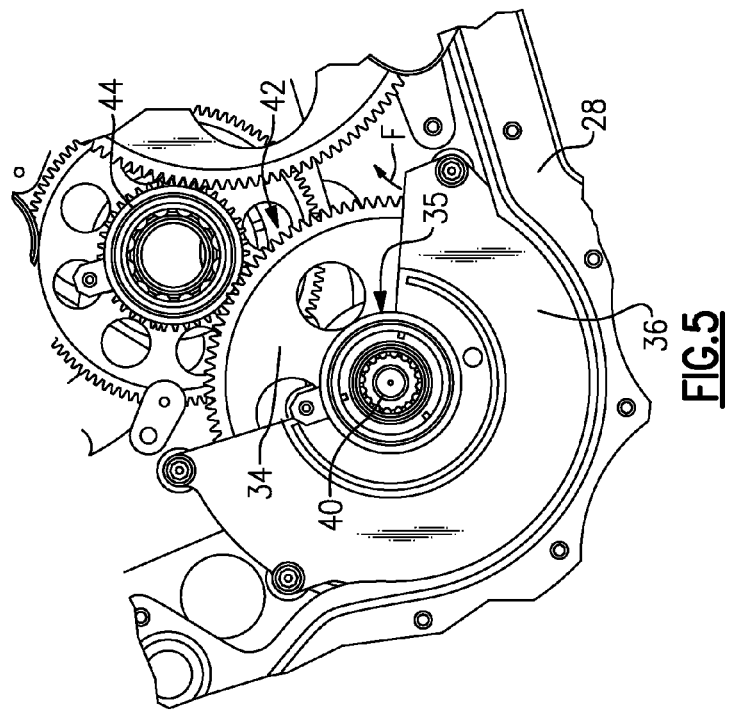
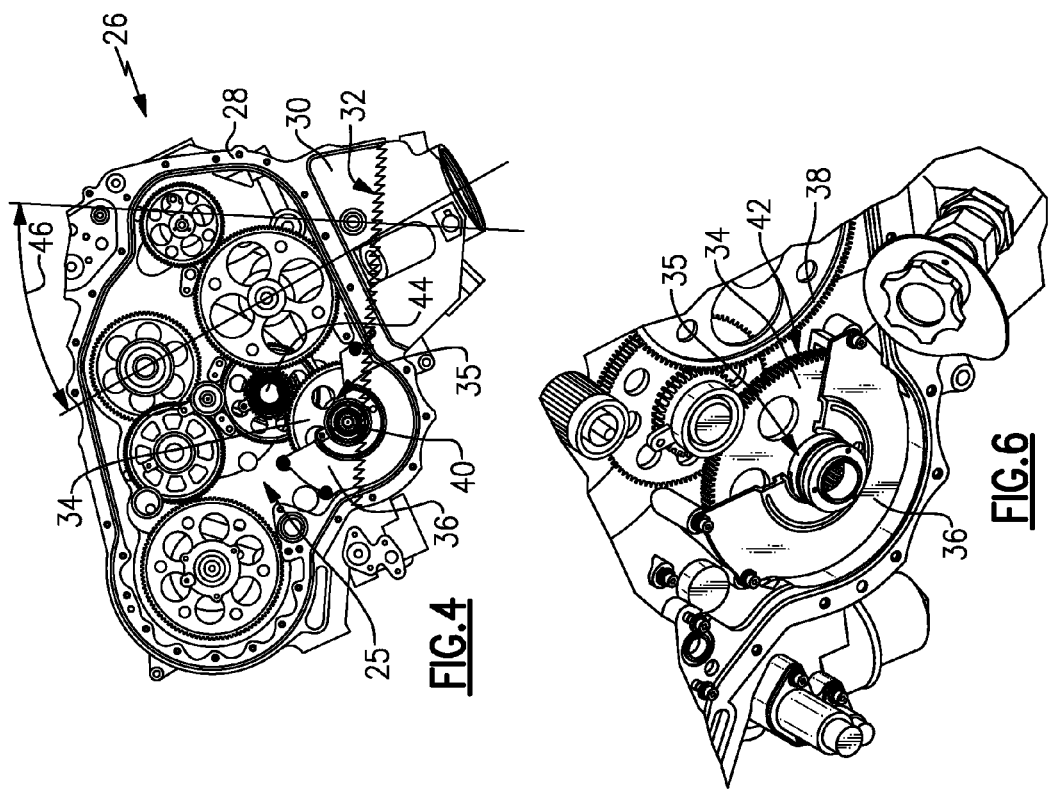

SUBMERGED GEAR AND BEARING GUARD

This subject of this disclosure was made with government support under Contract No.: N00019-06-C-0081 awarded by the United States Navy. The government therefore has certain rights in this invention.

BACKGROUND

This disclosure generally relates to an aircraft gearbox. More particularly, this disclosure relates to an aircraft gearbox for high attitude applications. Gears and bearings within a gearbox should not be submerged during operation. Accordingly, a gearbox is typically designed with a lubricant reservoir that maintains lubricant such that gears and bearings are not submerged during operation. In some aircraft applications, the extreme attitudes in which the gearbox is required to operate may result in some of the gears and/or bearings being at least partially submerged in the more extreme orientations. Some aircraft gearboxes for high attitude applications utilize large lubricant reservoirs to provide sufficient space to prevent gears and bearings from becoming submerged even at the more extreme orientations. Alternatively, some aircraft gearboxes utilized for extreme attitudes include lubricant pumps in combination with remote lubricant reservoirs to prevent submersion of gears.

SUMMARY

An example disclosed gearbox for an auxiliary power unit (APU) includes features that prevent submersion of gears and bearings in lubricant in extreme attitude orientations. The example gearbox includes a plurality of gears that drive various pumps, generators and other aircraft systems. An example shield surrounds a portion of one of the plurality of gears to prevent lubricant from submerging the gear and supporting bearings. The shield defines at least a portion of an open chamber that is at least partially surrounded by lubricant at extreme attitude orientations.

These and other features disclosed herein can be best understood from the following specification and drawings, the following of which is a brief description.

BRIEF DESCRIPTION OF THE DRAWINGS

FIG. 2 is a partial phantom view of a power plant system for the exemplary rotary wing aircraft.

FIG. 3 is a side view of the example auxiliary power unit.

FIG. 4 is a front view of an example gearbox at a high attitude orientation.

FIG. 5 is a front view of a portion of the example gearbox.

FIG. 6 is a perspective view of a portion of the example gearbox.

DETAILED DESCRIPTION

Figure 1:
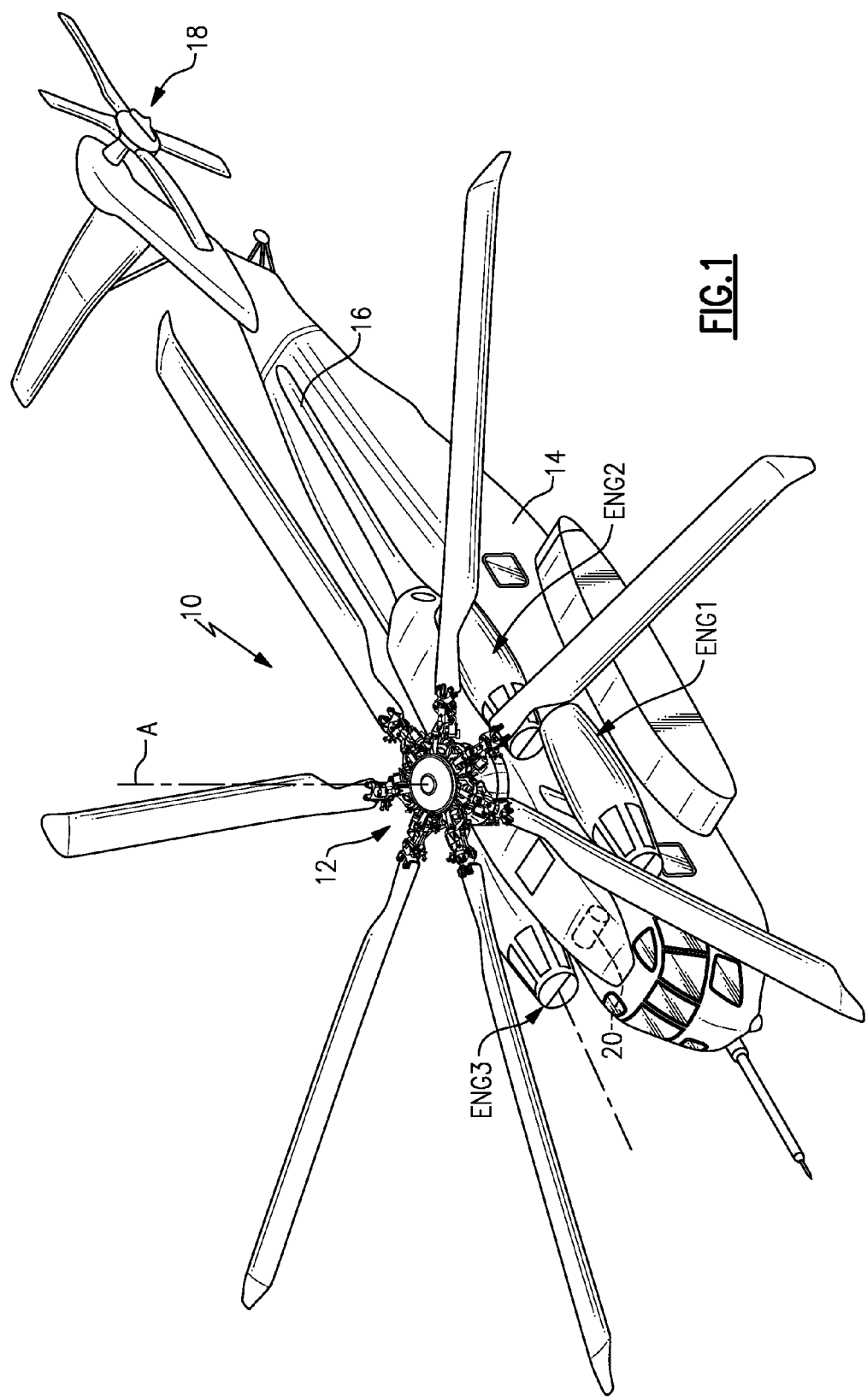
FIG. 1 is a perspective view of an exemplary rotary-wing aircraft including an example auxiliary power unit.

Referring to FIGS. 1 and 2, a rotary wing aircraft 10 includes a main rotor system 12, an airframe 14 and an extended tail 16. The extended tail 16 supports an anti-torque system 18. The main rotor system 12 is driven about an axis A by multiple power plants ENG1, ENG2 and ENG3. An auxiliary power unit 20 is also mounted to the airframe 14 and is coupled to a main rotor gearbox 22 along with the other power plants ENG1, ENG2 and ENG3. The power plants ENG1, ENG2 and ENG3 generate the power for flight operations and the APU 20 provides power utilized for operating various aircraft systems. Although a particular aircraft and power plant configuration is illustrated, other aircraft configurations and machines will also benefit from this disclosure. Operation of the example aircraft 10 includes high attitude orientations about the pitch, roll and yaw axes. Such high attitudes present challenges to the operation of systems that otherwise operate without issue at normal or less extreme orientations.

Referring to FIG. 3 with continued reference to FIGS. 1 and 2, the example APU 20 includes a gearbox 26 that is driven by a power plant 24. The example power plant 24 comprises a small gas turbine engine in comparison to the main propulsion power plants ENG1, ENG2 and ENG3. The gearbox 26 includes a plurality of gears that drive various pumps, generators and other aircraft systems. The gears operate at high speeds and require sufficient lubrication without becoming submerged within stored lubricant. Moreover, bearings supporting those gears also should not be completely submerged during operation. Submersion of rotating gears and bearings increases wear, reduces power output, and generates heat within the lubricant. Accordingly, the disclosed gearbox 26 includes features that prevent submersion of the gears and bearings during operation at extreme aircraft attitudes.

Referring to FIGS. 4, 5 and 6, the example gearbox 26 includes a housing 28 that supports a plurality of gears 25. The gearbox 26, and thereby the plurality of gears 25 disposed within are driven by the power plant 24 as is known. The example gearbox 26 is illustrated in FIG. 4 offset from an upright or normal operating position by a distance 46. The offset distance 46 represents the orientation of the gearbox 26 when the aircraft 10 is at extreme attitude that causes lubricant 32 within a sump 30 to potentially at least partially submerge a gear 34. A shield 36 surrounds a portion of the gear 34 to prevent lubricant 32 from submerging the gear 34. The shield 36 also prevents bearings that support the gear 34 from being submerged. The shield 36 forms a chamber 38 (best shown in FIG. 7) within which lubricant 32 is prevented from accumulating. The example chamber 38 is open and prevents lubricant from enveloping the gear 34 when lubricant 32 from the sump 30 moves to a level that would otherwise envelop some portion of the gear 34.

The gear 34 includes a hub portion 35 and is supported by a shaft 40. The gear 34 is engaged to a second gear 44 through a plurality of teeth 42 disposed about an outer periphery of the gear 34. The example shield 36 extends about approximately 270 degrees of the gear 34 such that an engaging portion of the gear teeth 42 are exposed. As should be understood, the specific configuration and angular coverage of the gear 34 could vary from the illustrated example to accommodate application specific requirements.

Figure 7:
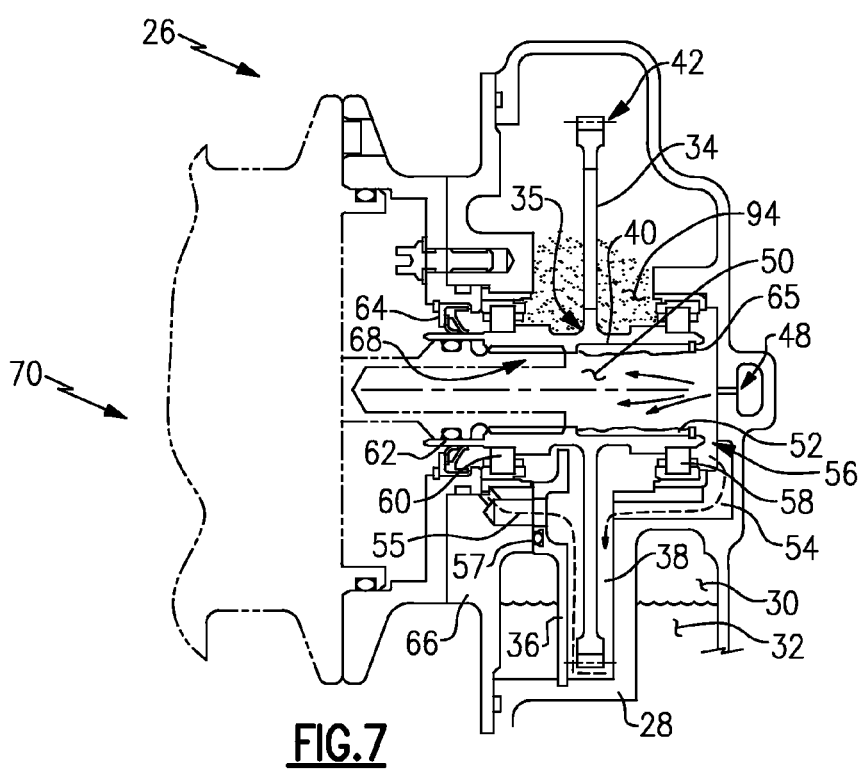
FIG. 7 is a cross-sectional view of a portion of the example gearbox.

Referring to FIG. 7 with continued reference to FIGS. 4 and 5, the example gear 34 and chamber 38 is shown in cross-section and includes a housing portion 66 that supports an aft bearing assembly 60. A forward bearing assembly 58 is supported by a portion of the housing 28. In this example, the bearing assemblies 58, 60 are lubricated by a lubricant mist, indicated at 94 that is generated within the interior of the gearbox assembly 26.

The example shield 36 cooperates with a portion of the housing 28 to define the boundary of the chamber 38. A seal 57 is disposed between the shield 36 and the housing portion 66 to prevent lubricant from submerging the bearings 58 and 60. A portion of the chamber 38 is disposed at least partially below a surface of lubricant 32 within the sump 30 at an attitude in which the gearbox 26 operates.

The example gear 34 includes the hub 35 that is integrally formed as part of the shaft 40. However, the gear 34 may also be a separate component attached to a separate shaft. The example shaft 40 includes an inner open cavity 50 that receives lubricant through a jet 48. Lubricant from the jet 48 provides lubricant to splines 68. Lubricant indicated at 52 received within the inner cavity 50 migrates to an outermost surface of the inner cavity 50 due to centrifugal forces generated by rotation. At the outermost surface of the inner cavity 50, the lubricant 52 builds up to a level metered by lip 65. Once lubricant 52 reaches a level that exceeds a radial height of the lip 65, the lubricant 52 will spill over and through an outlet 56. The outlet 56 directs lubricant to the forward and aft bearings 58, 60. Passages 54 and 55 define a route through which lubricant 52 is directed to the bearings 58, 60.

Lubricant 52 within the passage 55 is communicated through the shield 36. Moreover, the passage 54 communicates lubricant into the chamber 38 through the housing 28. Lubricant flows through the passages 54 and 55 in a draining manner, but is also drawn through the passages 54 and 55. Rotation of the gear 34 generates a flow of air commonly referred to as windage. The windage generated by the gear 34 causes a pressure differential at the open end of the passages 54 and 55 that draws lubricant from the open cavity 50 of the shaft 40. In other words, windage generated by the gear 34 causes a localized drop in pressure that in turn produces a suction that draws lubricant from the open cavity 50 through the passages 54 and 55 into the chamber 38.

Lubricant within the chamber 38 that is metered and pulled through the passages 55 and 54 does not accumulate within the chamber 38 as rotation of the gear 34 constantly drives lubricant 52 from the chamber 38. The teeth 42 and windage generated by the gear 34 carry lubricant 52 up and out of the chamber 38 where it is flung outward as indicated by arrow F in FIG. 5. This constant circulation of lubricant 52 through the chamber 38 provides the desired level of constant lubrication for the gear 34.

In operation, lubricant 52 is injected through the jet 48 into the inner cavity 50 of the shaft 40. Once within the inner cavity 50, lubricant 52 builds up along an outermost inner surface in response to centrifugal forces. The lubricant 52 provides lubrication for the splines 68 within the shaft 40. A seal 62 is provided at an interface between the spline 68 and the inner surface of the shaft 40. The inner cavity 50 includes the lip 65 that causes an accumulation of lubricant 52 to build to a desired level. Once the desired level is exceeded, lubricant 52 spills over and out through an opening 56 into the passages 54 and 55. Lubricant within the passages 54 and 55 is communicated to the forward and aft bearings 58, 60. An exterior lip seal 64 maintains lubricant within the bearing space for the aft bearing 60.

Lubricant within the passages 54 and 55 is also communicated to the chamber 38 to provide lubrication to the gear 34. Lubricant 52 builds up within the chamber 38 to a desired level. The desired level of lubricant within the chamber 38 is maintained by the continual process of the gear 34 pulling and flinging lubricant out of the chamber 38 and into the open spaces within the gearbox 26. Lubricant exhausted from the chamber 38 as is best shown by arrow F in FIG. 5, drains into the sump 30 where it is returned to the lubrication system. A pump or other device for pressurizing and moving lubricant within the gearbox 26 is included but not shown. As appreciated, any pumping device as is know could be utilized within the scope of this disclosure.

Figure 8:
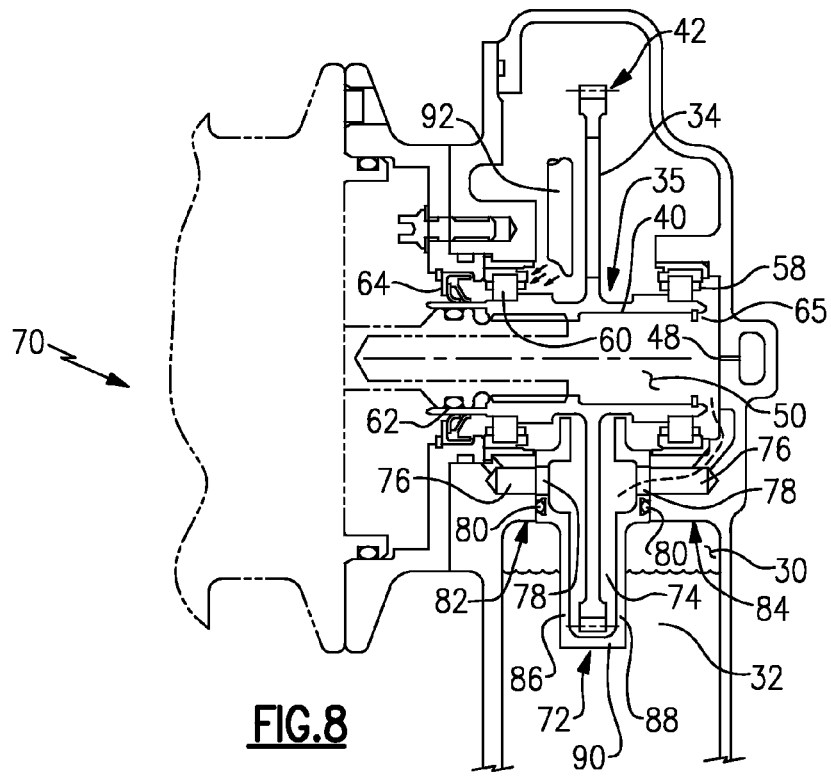
FIG. 8 is a cross-sectional view of a portion of another example gearbox.

Referring to FIG. 8, another gearbox 70 includes a shield 72 that defines sides 86, 88 and an outer periphery 90 that surround the gear 34. In this example, the shield 72 is supported by housing portions 82 and 84. Seals 80 are disposed between the shield 72 and the corresponding housing portions 82, 84. The seals 80 prevent lubricant from submerging the bearing assemblies 58 and 60.

Lubricant is supplied at least partially to the bearing assemblies 58, 60 by a nozzle, schematically shown as 92. In this example, only one nozzle 92 is shown directing lubricant to the aft bearing assembly 60, however another nozzle could be utilized to direct lubricant toward the forward bearing assembly 58.

The example shield 72 includes passages 76 through the housing and passages 78 through the shield 72. The passages 76 and 78 are in communication with the open cavity 50 that are defined within the housing portions 82, 84. The passages 76, 78 communicate lubricant that is exhausted from the inner cavity 50 of the shaft 40 into the chamber 74 defined by the shield 72. Windage generated by the gear 34 causes a localized drop in pressure across openings of the passages 76 and 78 that in turn draw lubricant through the passages 76 and 78 from the open cavity 50 into the chamber 74. The example shield 72 is a part separate from the housing portions 82, 84 and defines the walls 86, 88 and 90 of the chamber 74.

As should be appreciated, although the disclosed gearboxes 26, 70 include one gear 34 that is protected from submersion by the shield 36, 72, additional gears and bearings that may be submerged during operation could also be equipped with shields.

Accordingly, the example disclosed gearboxes 26, 70 include shields 36, 72 that both protect against submersion in extreme attitude orientations, but that also include features that provide lubrication to the enclosed gear and bearings. Moreover, the example shield 36, 72 provides for a more compact gearbox configuration as the distance that the gears must be spaced away from lubricant within the sump can be reduced, thus requiring a smaller sump.

It should be understood that relative positional terms such as "forward," "aft," "upper," "lower," "above," "below," and the like are with reference to normal operational attitude but should not be considered otherwise limiting. Moreover, like reference numerals identify corresponding or similar elements through the several figures.

Although an example embodiment has been disclosed, a worker of ordinary skill in this art would recognize that certain modifications would come within the scope of this disclosure. For that reason, the following claims should be studied to determine the scope and content of this invention.

What is claimed is:
1. A gearbox assembly comprising:
a housing defining a common open interior space;
at least one gear supported for rotation within the common open interior space of the housing;
a chamber defined by a shield disposed around less than an entire circumference of the at least one gear, the chamber open to the common open interior space;
a shaft supporting the at least one gear, the shaft including an inner cavity in communication with a supply of lubricant;
a jet supported within the housing for propelling lubricant into the inner cavity of the shaft; and
a sump for storing lubricant at a level at least partially surrounding the chamber within the common open interior space of the housing, wherein the shield includes a passage in communication with the inner cavity of the shaft for supplying lubricant to the at least one gear within the chamber.

2. The gearbox assembly as recited in claim 1, wherein the jet is disposed in the housing.

3. The gearbox assembly as recited in claim 1, wherein the shaft includes an outlet in communication with the inner cavity and an opening into the chamber for supplying lubricant to the at least one gear.

4. The gearbox assembly as recited in claim 1, including at least one bearing assembly supporting rotation of the shaft, the at least one bearing assembly in communication with the inner cavity such that lubricant from within the inner cavity of the shaft is supplied to the at least one bearing assembly.

5. The gearbox assembly as recited in claim 1, wherein the gear includes a central hub portion and an outer periphery portion, the outer periphery portion including a plurality of gear teeth and disposed at least partially within the chamber.

6. The gearbox assembly as recited in claim 1, wherein the shield comprises first and second sides disposed on opposing sides of the at least one gear, and a bottom side extending between the first and second sides and disposed outside of a periphery of the at least one gear.

7. The gearbox assembly as recited in claim 1, wherein the housing defines a portion of the sump with the shield cooperating with a portion of the housing to define the chamber.

8. An auxiliary power unit comprising:
a gas turbine engine; and
a gearbox configured to be driven by the gas turbine engine, the gearbox including a housing defining a common open interior space with at least one gear supported for rotation by a shaft and a sump for storing a lubricant within the housing, wherein the at least one gear is disposed within a chamber open to the common interior space of the housing and defined at least partially by a shield, the chamber at least partially disposed within a portion of the sump for storage of lubricant and the shield is disposed around less than an entire circumference of the at least one gear;
a lubricant passage within the gearbox for supplying lubricant to an inner cavity of the shaft; and
a passage from the inner cavity of the shaft through the shield for supplying lubricant to the at least one gear.

9. The auxiliary power unit as recited in claim 8, wherein the shield comprises front and back sides connected by an outer periphery that surrounds a portion of an outer periphery of the at least one gear.

10. The auxiliary power unit as recited in claim 8, wherein the chamber is defined on at least one side by a portion of the housing.

11. The auxiliary power unit as recited in claim 8, wherein the at least one gear includes a hub portion supported by the shaft and an outer periphery portion including a plurality of gear teeth.

12. The auxiliary power unit as recited in claim 8, including a jet supported within the housing for propelling lubricant into the inner cavity of the shaft.

13. The auxiliary power unit as recited in claim 12, wherein the jet is an integral part of the housing.

* * * * *